(12) United States Patent
Yamamura et al.

(10) Patent No.: US 7,953,974 B2
(45) Date of Patent: May 31, 2011

(54) AUTHENTICATION METHOD, AUTHENTICATION SYSTEM, AND TAG DEVICE THEREOF, DATA REFERENCE CLIENT, AUTHENTICATION SERVER, AND DATA SERVER

(75) Inventors: Shinya Yamamura, Yokohama (JP);
Yoshiharu Sato, Yokohama (JP);
Katsunori Iwamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 979 days.

(21) Appl. No.: 11/826,891

(22) Filed: Jul. 19, 2007

(65) Prior Publication Data

US 2007/0262852 A1    Nov. 15, 2007

Related U.S. Application Data

(63) Continuation of application No. PCT/JP2005/002454, filed on Feb. 17, 2005.

(51) Int. Cl.
*H04L 29/06* (2006.01)
*H04L 9/32* (2006.01)
(52) U.S. Cl. .................... 713/168; 713/150; 713/162
(58) Field of Classification Search .......... 713/168, 713/162, 150
See application file for complete search history.

(56) References Cited

U.S. PATENT DOCUMENTS 6,538,761 B1    3/2003    Yokono et al.

FOREIGN PATENT DOCUMENTS

| JP | 10-124781 | 5/1998 |
| JP | 11126186 | 5/1999 |
| JP | 2004-70463 A | 3/2004 |
| JP | 2004-309836 A | 11/2004 |
| WO | 2004093381 A1 | 10/2004 |

OTHER PUBLICATIONS

FLMAP: A fast lightweight mutual authentication protocol for RFID systems Sadighian, A.; Jalili, R.; Networks, 2008. ICON 2008. 16th IEEE International Conference on ; Publication Year: 2008 , pp. 1-6.*
Trapdoor-based Mutual Authentication Scheme without Cryptographic Primitives in RFID Tags ; Hwaseong Lee; Eun Young Choi; Su-Mi Lee; Dong Hoon Lee; Security, Privacy and Trust in Pervasive and Ubiquitous Computing, 2007. SECPerU 2007. Third International Workshop on; Publication Year: 2007 , pp. 73-78.*
A Dynamic Mutual RFID Authentication Model Preventing Unauthorized Third Party Access; Schapranow, M.-P.; Zeier, A.; Plattner, H.; Network and System Security (NSS), 2010 4th International Conference on; Publication Year: 2010 , pp. 371-376.*
S. Kinoshita, et al., "Low Cost RFID Privacy Hogo Hoho," *Transactions of Information Processing Society of Japan*, Information Processing Society of Japan, vol. 45, No. 8, Aug. 10, 2004, pp. 2007-2020.
English Translation of Office Action in corresponding JP patent application No. 2007-503524 dated Apr. 27, 2010.

* cited by examiner

*Primary Examiner* — David Y Jung
(74) *Attorney, Agent, or Firm* — Fujitsu Patent Center

(57) ABSTRACT

The present invention is an authentication method for disclosing identification data of an object and authenticating when referring to data of the object corresponding to the identification data based on the identification data and can associate a tag device and data of a referring entity and authenticate that data of the tag device is referred by a proper referring entity by generating a third value by conducting a predetermined calculation with a temporary first value indicating a most recent referral to the identification data of the object and a temporary reference second value issued to a referring entity of the identification data for each referral, and authenticating a relationship between the object and the referring entity by verifying the third value.

13 Claims, 15 Drawing Sheets

AUTHENTICATION METHOD, AUTHENTICATION SYSTEM, AND TAG DEVICE THEREOF, DATA REFERENCE CLIENT, AUTHENTICATION SERVER, AND DATA SERVER

CROSS-REFERENCE TO RELATED APPLICATIONS

This application is a U.S. continuation application filed under 35 USC 111(a) claiming benefit under 35 USC 120 and 365(c) of PCT application JP 2005/002454, filed Feb. 17, 2005. The foregoing application is hereby incorporated herein by reference.

BACKGROUND OF THE INVENTION

1. Field of the Invention

The present invention relates to an authentication method, an authentication system, a tag device thereof, a data reference client, authentication server and a data server, and more particularly to an authentication method, an authentication system, a tag device thereof, a data reference client, an authentication server and a data server for disclosing identification data of an object and performing authentication when referring to data of an object corresponding to identification data based on identification data.

2. Description of the Related Art

Various methods of utilizing wireless tags, starting with those in the field of SCM (Supply Chain Management), are being proposed. Wireless tags are gathering attention as the next fundamental technology for the future ubiquitous society. It is, however, anticipated that wireless tags shall face various security problems since there is no mechanism for managing the relationships between wireless tags and those referring to the wireless tags.

There are several technologies for preventing data of wireless tags from being randomly read out. There is, for example, preventing a wireless tag from being read out by a reading apparatus by carrying a special wireless tag, referred to as a "blocker tag" that covers the wireless tag with a special shield for localizing data of the wireless tag. However, such technologies can only permit a choice of either disclosing data or not disclosing data and cannot control disclosure for each one of plural wireless tags.

To provide a mechanism that allows disclosure of wireless tag data to be freely controlled according to the will of the current manager of the wireless tag is a point for popularizing services using wireless tags attached to such products.

It is to be noted that Patent Document 1 describes preparing a database of the history processing products with wireless tags attached. Patent Document 1: Japanese Laid-Open Patent Application No. 10-124781

Security problems anticipated in conventional technologies are described below.

First, there is intentional manipulation of data by taking advantage of the fact that there is no check on whether proper reference is made to data. Attacks with misleading data can be made by distributing the same IDs to plural servers. Second, tracking of data (unauthorized access) can be performed by taking advantage of the global characteristics of wireless tags (the fact that data of wireless tags of the same standard can be read by a given wireless tag reading apparatus).

As for a more specific example of the first problem, there is a case of a management system for producing agricultural products using wireless tags in which the pesticide used during growth of a vegetable is automatically added to a vegetable management history log by obtaining data from a wireless tag assigned to the pesticide. However, in reporting the wireless tag data assigned to the pesticide, it is possible that false data be recorded by falsely transmitting an ID corresponding to a pesticide not actually used (e.g., less harmful pesticide) in a case where there is no checking of whether reference is made to the wireless tag corresponding to the pesticide. As for similar examples, there are falsifying attendance at work or obtaining privileges without purchasing a product.

As for a more specific example of the second problem, there is a case where consumers can easily refer to product data by using a wireless tag reading apparatus mounted on a mobile phone or the like where wireless tags are assigned to CDs, books, and memo pads carried in bags of the consumers for product management. In a case where the effective range of the wireless tags is approximately 3 meters, besides data of one's belongings, it is possible that data of other objects within the 3 meter periphery be collected. For example, in a coffee shop, it is not difficult to identify the owner of an object in an environment of few people. Although collecting data from each object may cause little damage, various estimations can be made by combining the data.

For example, by knowing the title of a product, such as a CD or a book, one can estimate preferences of that person. By knowing the manufacturer of a memo pad or a bag, one can estimate to some extent how wealthy that person is. As a similar example, there is scanning another shop's inventory status.

It is a general object of the present invention to provide an authentication method, an authentication system, and a tag device thereof, a data reference client, an authentication server, and a data server for associating a tag apparatus with a referring entity and authenticating that data of the tag apparatus has been referred to by a proper referring entity, to thereby obviate the above-described problems.

SUMMARY OF THE INVENTION

The present invention may provide a an authentication method, an authentication system, a tag device thereof, a data reference client, authentication server and a data server that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an authentication method, an authentication system, a tag device thereof, a data reference client, authentication server and a data server particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an authentication method for disclosing identification data of an object and authenticating when referring to data of the object corresponding to the identification data based on the identification data, the authentication method including: generating a third value by conducting a predetermined calculation with a temporary first value indicating a most recent referral to the identification data of the object and a temporary reference second value issued to a referring entity of the identification data for each referral; and authenticating a relationship between the object and the referring entity by verifying the third value.

DESCRIPTION OF THE PREFERRED EMBODIMENTS

Embodiments of the present invention are described below with reference to the drawings.

Figure 1:
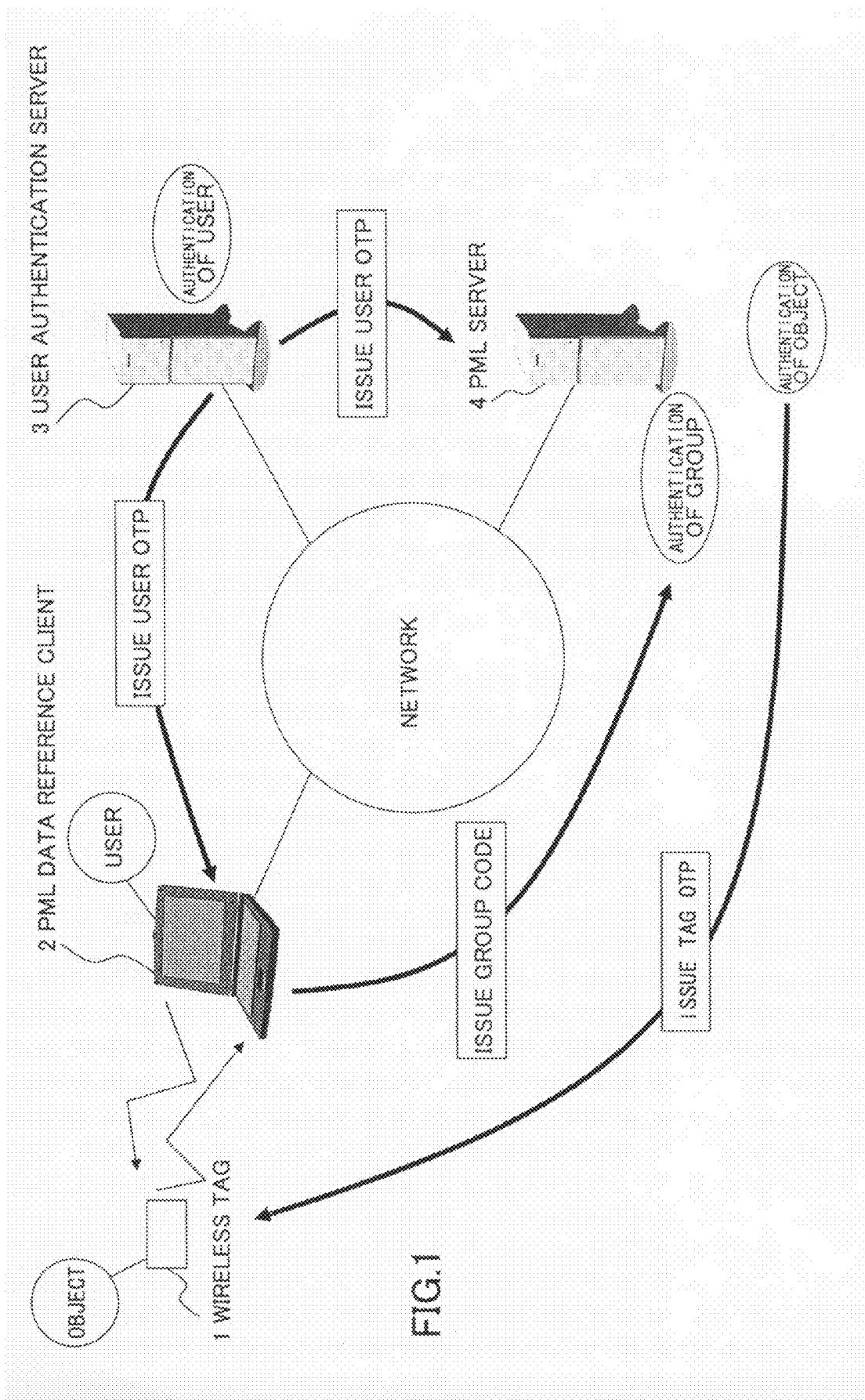
FIG. 1 is a schematic diagram of a wireless tag authentication system according to an embodiment of the present invention.

FIG. 1 is a schematic diagram showing a wireless tag authentication system according to an embodiment of the present invention. In the diagram, a wireless tag 1 is a device having a function of decoding a one time tag password (T-SEED) reported from a PML server 4 and disclosing it together with an identification code (T-ID) for authenticating that it has been referred to. The present invention does not particularly limit the communication method of the wireless tag 1, and the wireless communication may include an optical methodology such as infrared. Furthermore, the wireless tag also includes a contact type device such as an IC card. In this description, data regarding an object is called "PML data". However, it is not to be limited to that used for PML (Physical Markup Language) defined in EPC global. The term "PML data" includes data regarding an object that are expressed in some other forms.

A PML data reference client 2 may be a personal computer (PC), a PDA (Personal Digital Assistant), or a communication terminal (e.g., mobile phone) including a wireless tag reading apparatus, having a function of obtaining a one time reference password (U-SEED, T-SEED) from a user authentication server 3 and the PML server 4 and generating a group authentication code from the one time reference password prior to referring to PML data (object data) shown by the wireless tag 1 and a function of showing a reference relationship with respect to the wireless tag 1 with the group authentication code when referring to the PML data. The PML data reference client 2 may also be a server apparatus bundling plural wireless tag reading apparatuses.

The user authentication server 3 is an apparatus having a function of authenticating the user referring to the PML data and issuing a one time user password (U-SEED) to the PML data reference client 2 and the PML server 4. The present invention does not particularly limit the user authentication method and may use any authentication protocol capable of transmitting wireless tag data (as attached data) required for the present invention.

The PML server 4 is an apparatus having a function of generating and issuing a one time wireless tag password (T-SEED) for authenticating authorized reference of a wireless tag, a function of generating a group authentication code with the one time wireless tag password along with the one time user password (U-SEED) reported from the user authentication server 3, a function of authenticating a relationship between the user and the object, and a function of controlling disclosure of data regarding the object (PML data) defined by XML format.

Figure 2:
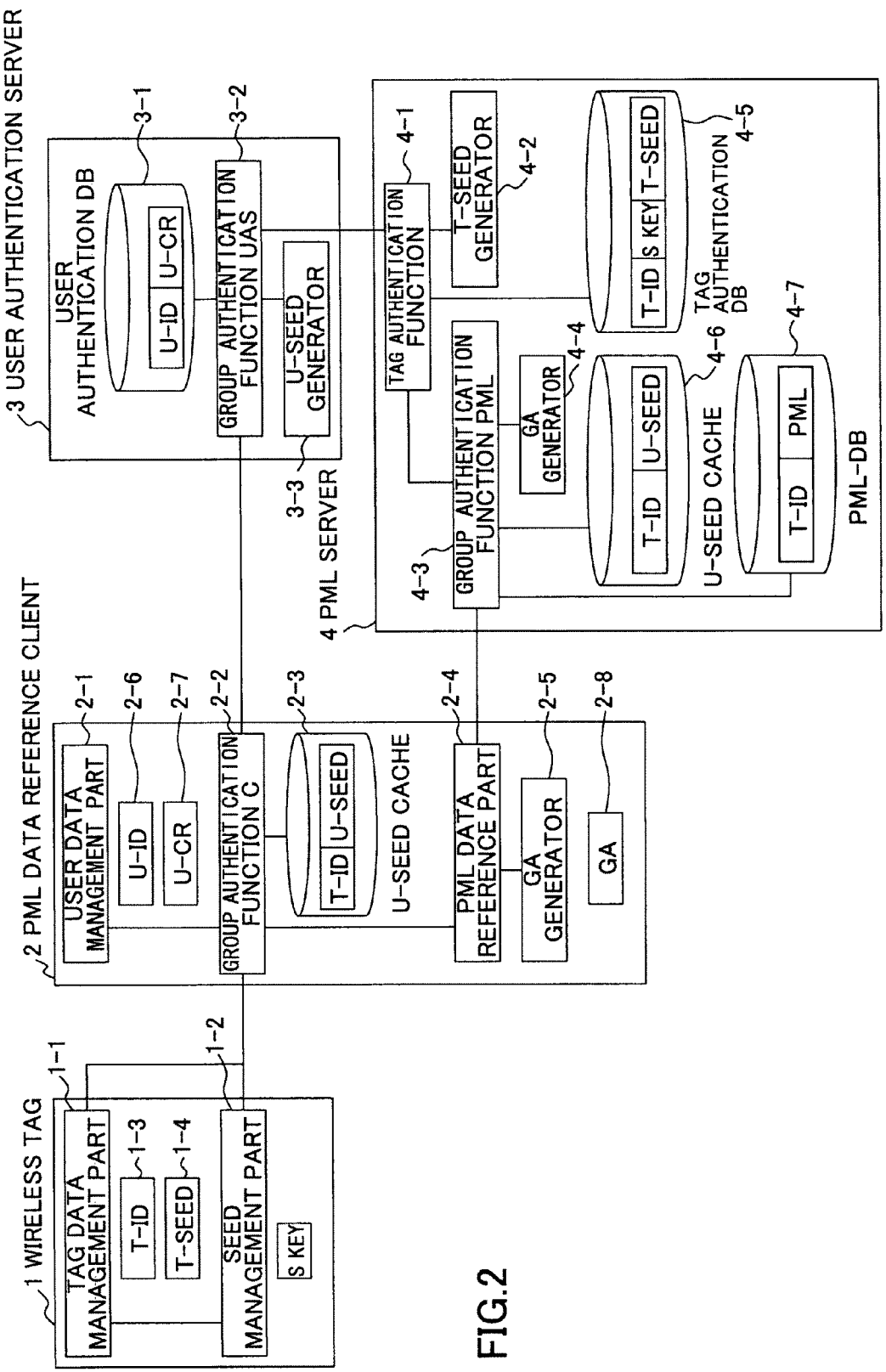
FIG. 2 is a block diagram showing functions of each apparatus in a wireless tag authentication system of the present invention.

FIG. 2 is a block diagram showing functions of each apparatus in a wireless tag authentication system according to an embodiment of the present invention. The substantive body of each function block is a program that is loaded in a memory (e.g., RAM) and executed by a CPU of a media reference apparatus having the functions of the present invention.

In FIG. 2, the wireless tag 1 includes a tag data management part 1-1 and a SEED management part 1-2. The tag management part 1-1 stores a tag identification code T-ID 1-3 and a one time password T-SEED 1-4 in its internal memory for uniquely identifying a wireless tag and responds with the T-ID 1-3 and T-SEED 1-4 in response to a wireless transmitted read-out request from the PML data reference client 2.

The SEED management part 1-2 shares a key (S-key) with the PML server 4 for decrypting the encrypted one time password T-SEED. Thus, the SEED management part 1-2 decrypts the T-SEED, being generated, encrypted (with the S-key), and sent by the PML server, and records the T-SEED in the internal memory of the tag data management part 1-1.

The PML data reference client 2 includes a user data management part 2-1, a group authentication function C (Client) 2-2, a U-SEED cache 2-3, a PML data reference part 2-4, and a GA generator 2-5.

The user data management part 2-1 stores user identification codes U-ID 2-6 and users certificates U-CR 2-7 in its internal memory and manages the user identification codes U-ID 2-6 and user certificates U-CR 2-7. The group authentication function client 2-2 combines the tag identification code T-ID and the one time password T-SEED read from the wireless tag 1 with the user identification code U-ID and the user certificate U-CR stored in the user data management part 2-1, and sends a wireless tag reference request to the user authentication server 3. Then, the user data management part 2-1 associates a tag identification code T-ID with the one time user password U-SEED in a message of a wireless tag reference response sent from the user authentication server 3 and records the one time user password U-SEED T-ID and the tag identification code T-ID in the U-SEED cache 2-3. The user data management part 2-1 sends the T-SEED protected with the S-key to the SEED management part 1-2 of the wireless tag 1.

The PML data reference part 2-4 provides a one time password T-SEED read from the wireless tag and a one time password U-SEED recorded in the U-SEED cache 2-3 to the GA generator 2-5 and sends a PML data request including a generated group authentication code GA (Group Authenticator) to the PML server 3.

The GA generator 2-5 calculates a group authentication code GA and returns the calculation results. The group authentication code GA is generated, for example, with G (T-SEED, U-SEED). Here, G( ) is a hash function.

Figure 3:
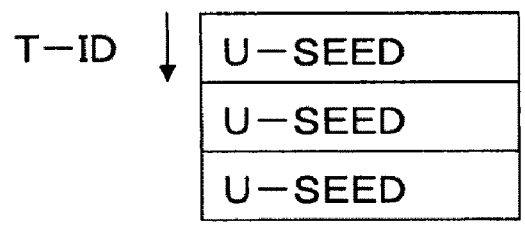
FIG. 3 is a diagram showing a configuration of a U-SEED cache 2-3, 4-6.

FIG. 3 shows a configuration of the U-SEED caches 2-3 and 4-6. The U-SEED cache includes one time passwords U-SEEDs corresponding to tag identification codes T-IDs. The tag identification code T-ID uniquely identifies a wireless tag. The one time password U-SEED is a temporary password generated by the user authentication server 3 for use in referring to wireless tags. The one time password U-SEED is, for example, a random number of 128 bits. Furthermore, the one time password U-SEED is also material for generating the group authentication code GA and is also referred to as a user seed.

Next, the user authentication server 3 includes a group authentication function server (UAS, User Agent Server) 3-2, a U-SEED generator 3-3, and a user authentication DB (Data Base) 3-1.

The group authentication function server (UAS) 3-2 performs user authentication by comparing the user identification code U-ID and the user certificate U-CR in the message of the wireless tag reference request sent from the PML data reference client 2 with the U-ID and the U-CR stored in the user authentication DB. When authentication succeeds, the user authentication server 3 uses the U-SEED generator 3-3 for generating a U-SEED and sends the U-SEED along with a tag identification code T-ID and a one time password T-SEED to the PML server 4. Furthermore, the user authentication server 3 sends a new T-SEED (protected with an S-key sent from the PML server 4) along with the U-SEED to the PML data reference client 2.

The U-SEED generator 3-3 generates secret data of the user associated with the current tag identification code T-ID. The U-SEED is, for example, a digit sequence generated from a random number of 128 bits.

Figure 4:
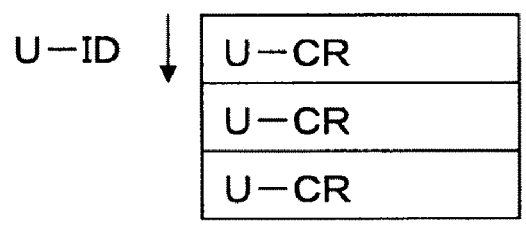
FIG. 4 is a diagram showing a configuration of a user authentication DB 3-1.

FIG. 4 shows a configuration of the user authentication DB 3-1. The user authentication DB 3-1 includes user certificates U-CRs corresponding to user identification codes U-IDs. The user identification code U-ID is an identification code that uniquely identifies a user, for example, a user account. The user certificate U-CR (User Credential) is, for example, a password verifying the user or a certificate issued by a certificate authority.

Next, the PML server 4 includes a tag authentication function 4-1, a T-SEED generator 4-2, a group user authentication function server (PML (Physical Markup Language) server) 4-3, a GA generator 4-4, a tag authentication DB 4-5, a U-SEED cache 4-6, and a PML-DB 4-7.

The tag authentication function 4-1 performs authentication by comparing a pair of a tag identification code T-ID and a one time password T-SEED sent from the user authentication server with a pair of T-ID and T-SEED in the tag authentication DB 4-5. When the authentication succeeds, the PML server uses the T-SEED generator 4-2 to generate a new T-SEED and updates the T-SEED in the tag authentication DB 4-5. Furthermore, the PML server 4 provides a U-SEED sent from the user authentication server 3 to the group authentication function PML 4-3. Furthermore, the PML server 4 encrypts the new T-SEED with the S-key in the tag authentication DB 4-5 and sends the new T-SEED to the user authentication server 3.

The group authentication function PML 4-3 records the one time password U-SEED sent from the user authentication server 3 in the U-SEED cache 4-6. In a case where there is a PML data call request from the PML data reference client 2, a group authentication code GA is obtained by inputting a one time password U-SEED and a one time password T-SEED extracted from a received T-ID. By comparing the group authentication code GA with the GA sent from the PML data reference client 2, the validity of the relationship between the tag and the reference user can be verified. When the verification succeeds, PML data are extracted from the PML-DB 4-7 and sent to the PML data reference client 2.

The GA generator 4-4 calculates the group authentication code GA=G(T-SEED, U-SEED) (Here, Go is a hash function) and returns the calculation results.

Figure 5:
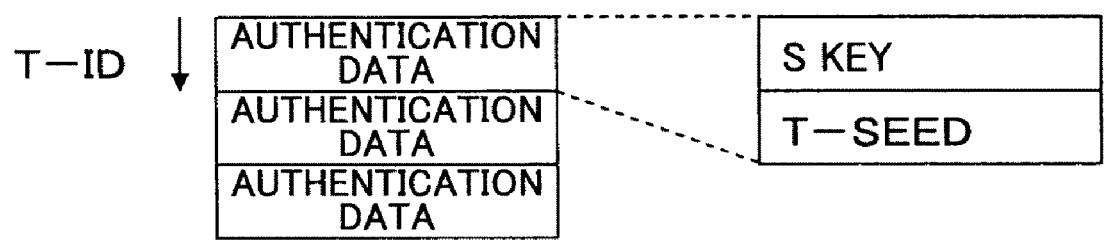
FIG. 5 is a diagram showing a configuration of a tag authentication DB 4-5.

FIG. 5 shows a configuration of a tag authentication DB 4-5. The tag authentication DB 4-5 includes authentication data corresponding to tag identification codes T-IDs. The authentication data include an S-key and a one time password T-SEED. The S-key is a shared secret key between the PML server 4 and the wireless tag 1 and is used for encrypting and decrypting the one time password T-SEED used for secretly exchanging the one time password T-SEED between the PML server 4 and the wireless tag 1.

The one time password T-SEED includes data generated by the PML server 4 for indicating the most recent referral of a wireless tag. The one time password T-SEED is, for example, a random number of 128 bits. Furthermore, the one time password T-SEED is also material for generating the group authentication code GA and is also referred to as tag seed.

Figure 6:
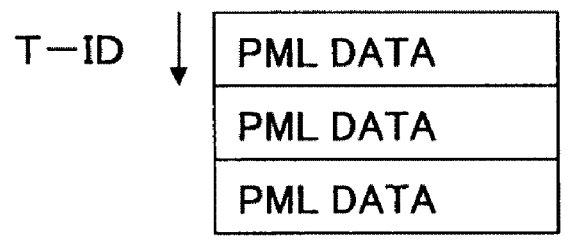
FIG. 6 is a diagram showing a configuration of a PML-DB 4-7.

FIG. 6 shows a configuration of the PML-DB 4-7. The PML-DB 4-7 includes PML data corresponding to tag identification codes T-IDs. The tag identification code T-ID is a value that uniquely identifies a wireless tag. The PML data define the data regarding an object in an XML format.

Figure 7:
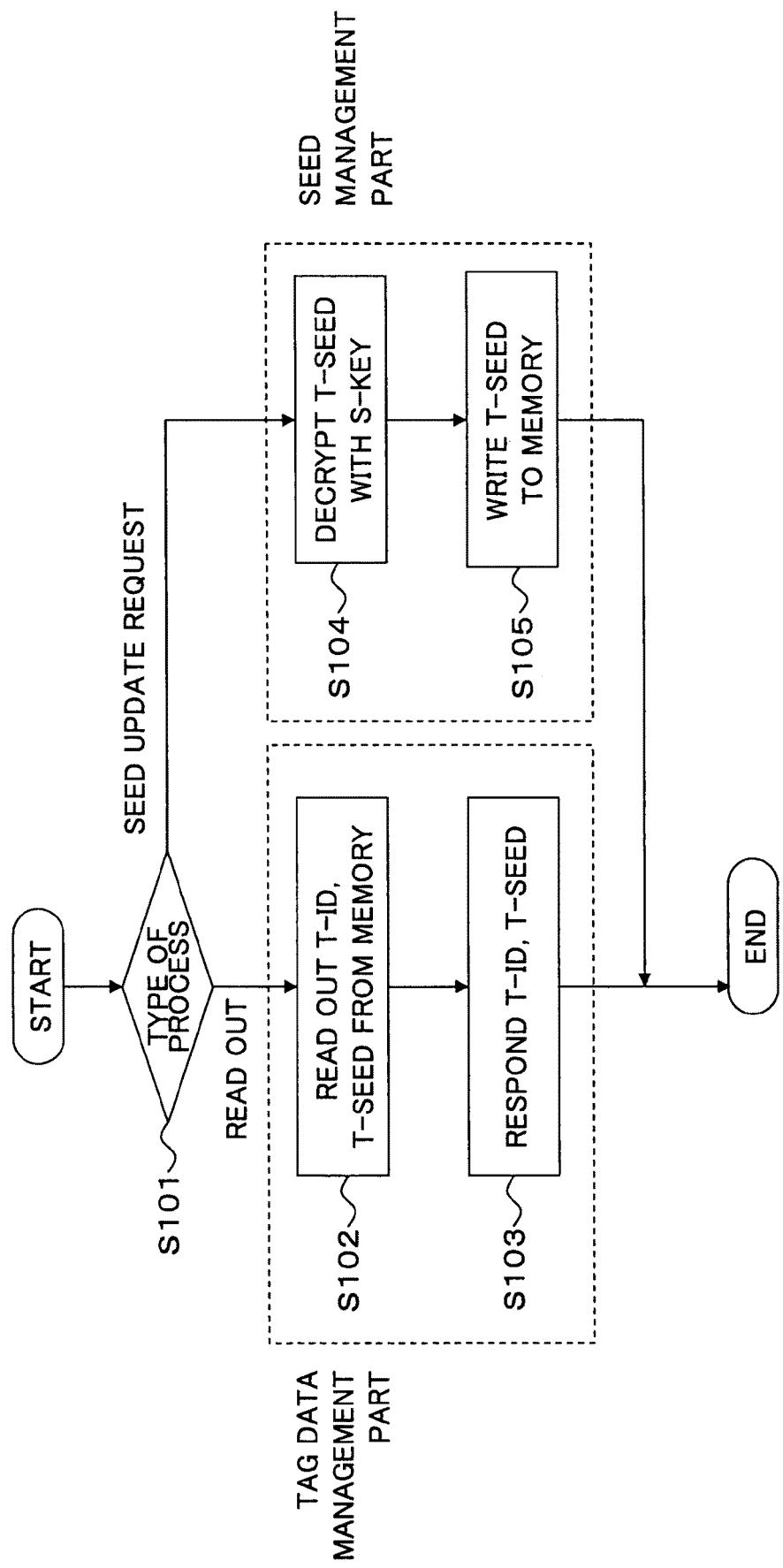
FIG. 7 is a flowchart of an operation of a wireless tag 1.

FIG. 7 is a flowchart of an operation by the wireless tag 1. The operation is initiated upon reception of a command wirelessly transmitted from the PML data reference client 2.

In the drawing, a command being wirelessly transmitted from the PML data reference client 2 is analyzed in Step S101. If it is a read-out request, the operation proceeds to Step S102 in which the tag data management part 1-1 is activated and a tag identification code T-ID and a one time password T-SEED are read out from the internal memory. Then, in Step S103, the T-ID and the T-SEED are returned to the PML data reference client.

Meanwhile, if it is a SEED update request, the operation proceeds to Step S104 in which the SEED management part 1-2 is activated and an encrypted T-SEED in the transmitted update request command is decrypted by using the S-key. Then, in Step S104, the T-SEED is recorded in the internal memory of the tag data management part 1-1.

Figure 8:
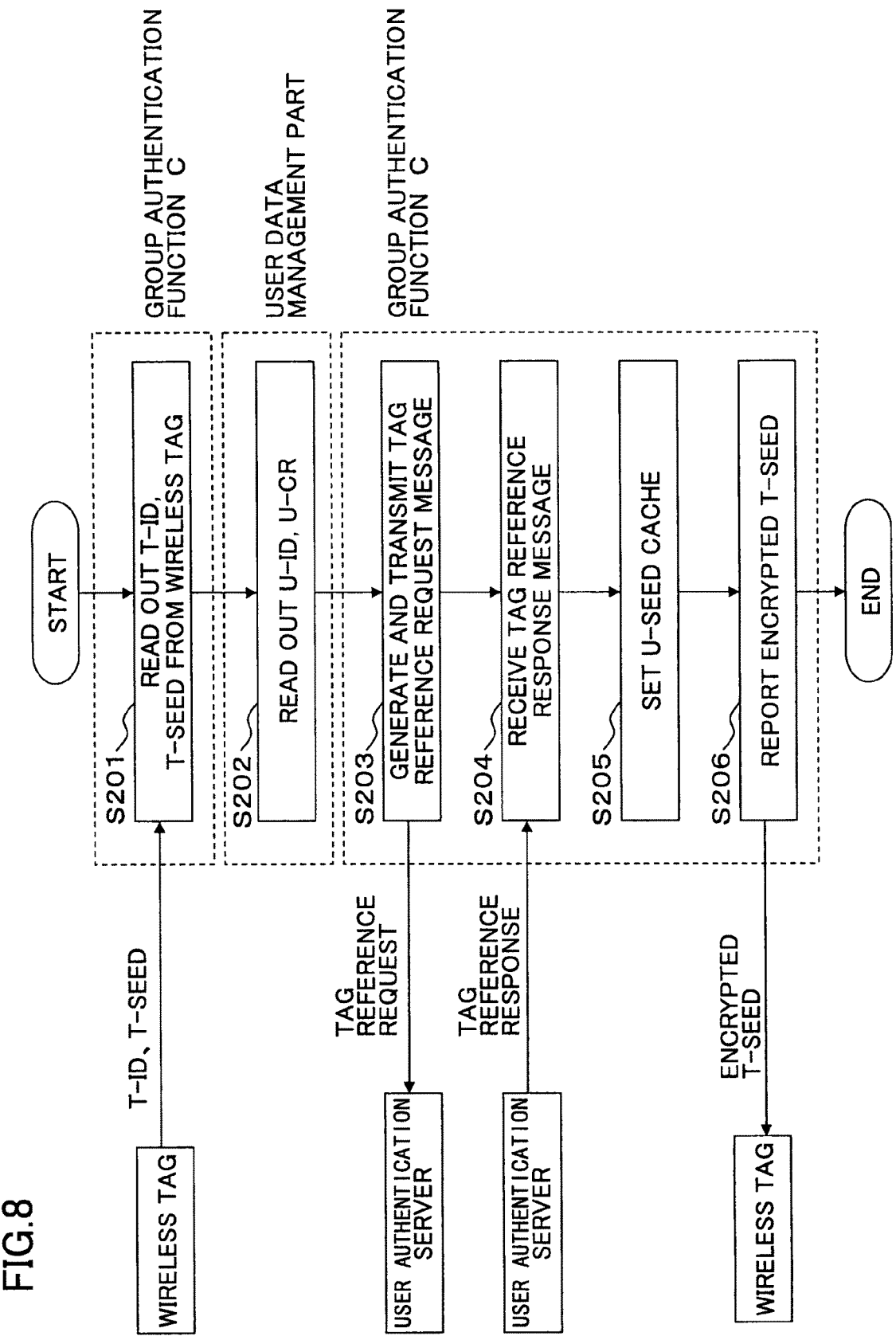
FIG. 8 is a flowchart of an operation during tag referral by a PML data reference client 2.
Figure 9:
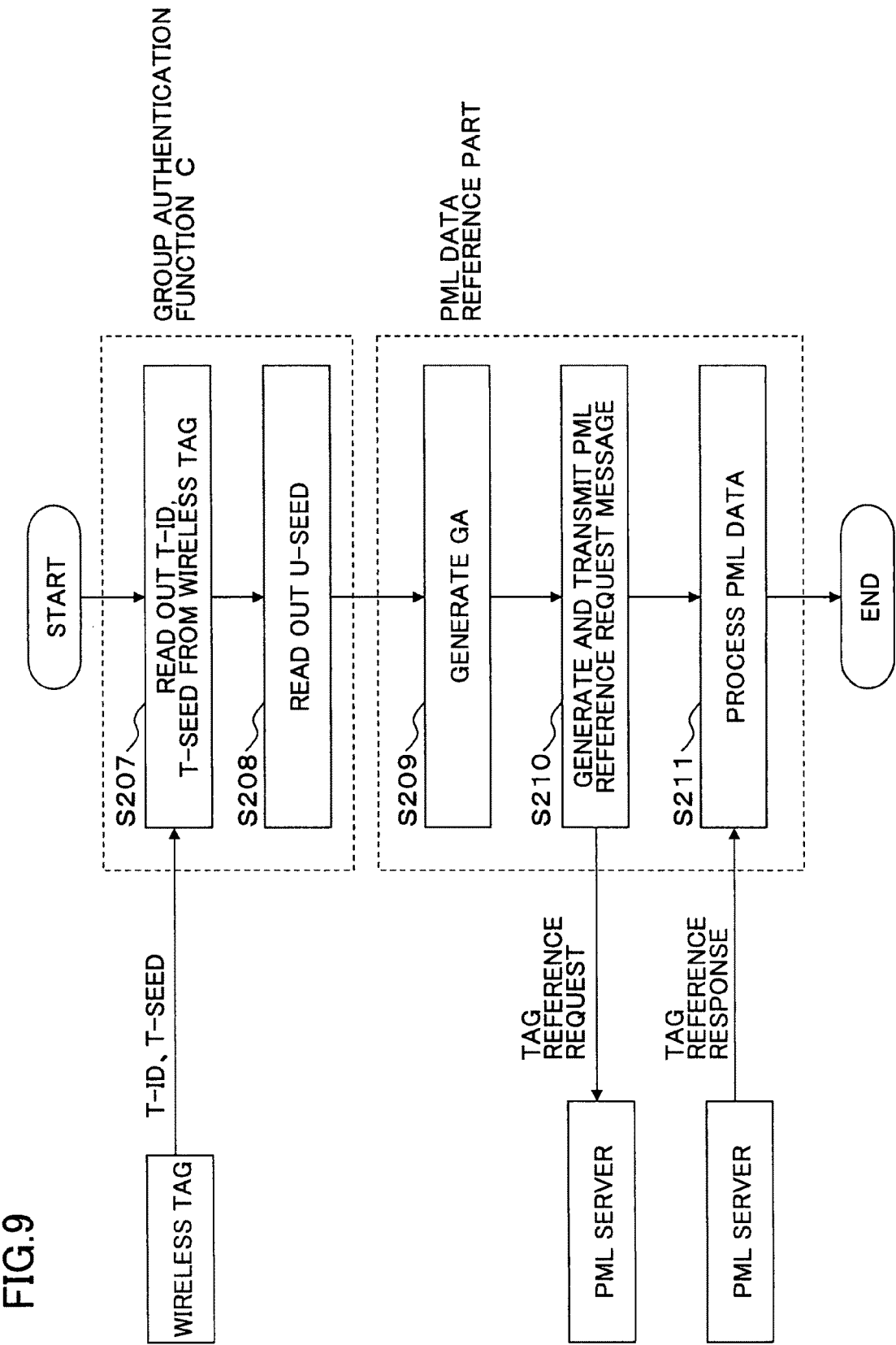
FIG. 9 is a flowchart of an operation during PML data referral by a PML data reference client 2.

FIG. 8 is a flowchart of an operation by the PML data reference client 2 when referring to a tag. FIG. 9 is a flowchart of an operation by the PML data reference client 2 when referring to PML data.

In Step S201 in FIG. 8, a read command is wirelessly transmitted to the wireless tag 1 to thereby read out a tag identification code T-ID and a one time password T-SEED. In Step S202, a user identification code U-ID and a user certificate U-CR are read out from the user data management part 2-1.

Then, in Step S203, a tag reference request message with a T-ID, a T-SEED, a U-ID, and a U-CR is generated and transmitted to the user authentication server 3. In Step S204, a tag reference response message is received from the user authentication server 3. In Step S205, a one time password U-SEED indicated in the tag reference response message is recorded in the U-SEED cache 2-3.

Then, in Step S206, an encrypted T-SEED indicated in the tag reference response message is reported (wirelessly) in a report command to the wireless tag 1.

In Step S207 of FIG. 9, a read command is wirelessly transmitted to the wireless tag 1, to thereby read out a tag identification code T-ID and a one time password T-SEED. In Step S208, a one time password U-SEED is extracted from the U-SEED cache 2-3.

Then, in Step S209, a T-SEED and a U-SEED are supplied to the GA generator 2-5, to thereby generate a group authentication code GA. In Step S210, a PML reference request message including the generated group authentication code GA is generated and transmitted to the PML server 4. In Step S211, a PML reference response message sent from the PML server 4 is received, to thereby process PML data.

Figure 10:
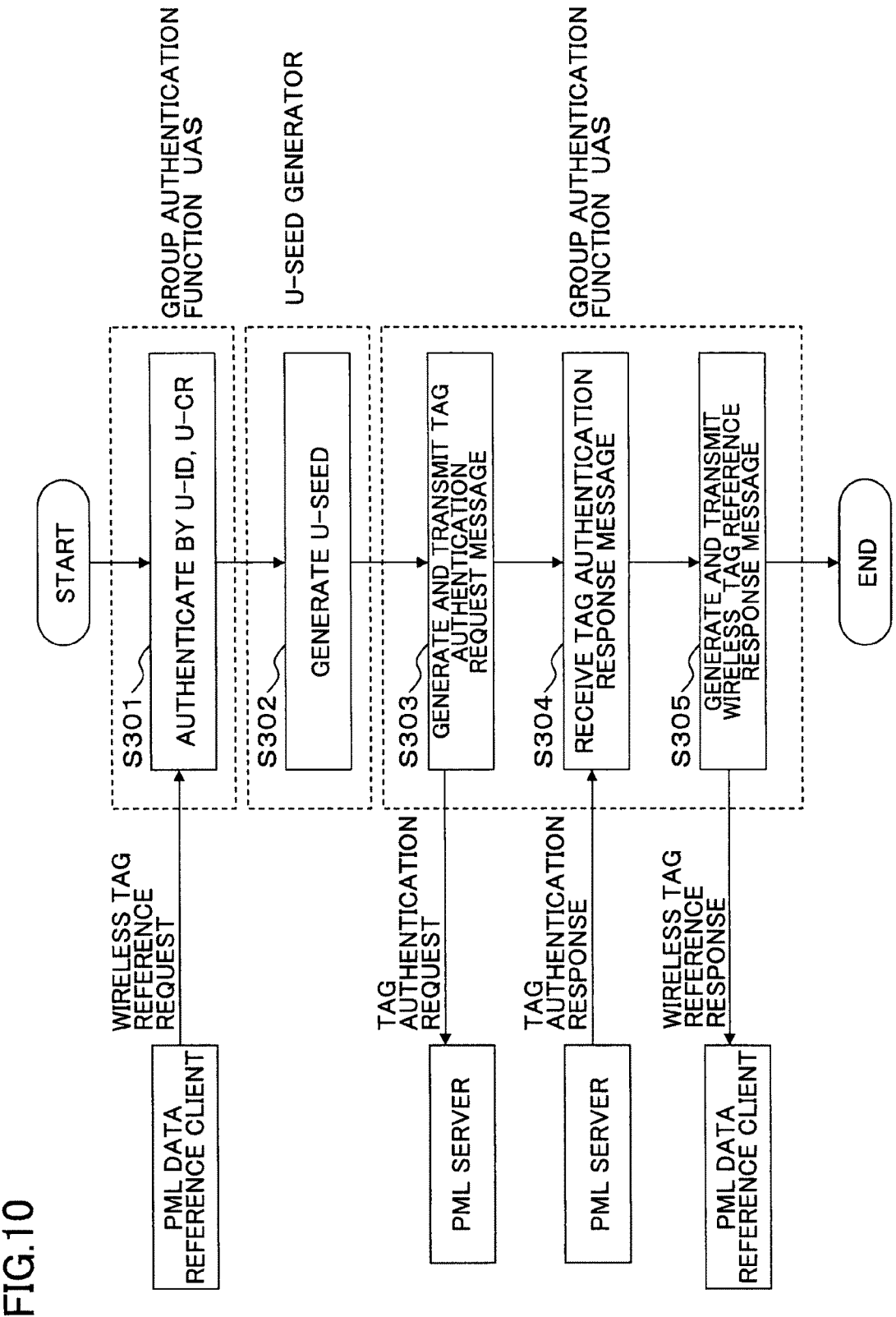
FIG. 10 is a flowchart of an operation of a user authentication server 3.

FIG. 10 is a flowchart of an operation by the user authentication server 3. This operation is initiated upon receiving a wireless tag reference request message. In the drawing, in Step S301, a user identification code U-ID and a user certificate U-CR are extracted from the wireless tag reference request message and authentication of the user is performed by comparing the extracted U-ID and U-CR with a U-ID and a U-CR stored in the user authentication DB 3-1.

Then, in Step S302, a one time password U-SEED is generated by using the U-SEED generator 3-3.

Then, in Step S303, a tag authentication request message set with a tag identification code T-ID, and one time passwords T-SEED and U-SEED is generated and transmitted to the PML server 4.

In Step S304, a tag authentication response message transmitted from the PML server 4 is received. Then, in Step S305, a wireless tag reference response message, being set with a new T-SEED encrypted in the tag authentication response message and a U-SEED generated in the above-described Step S302, is generated and transmitted to the PML data reference client 2.

Figure 11:
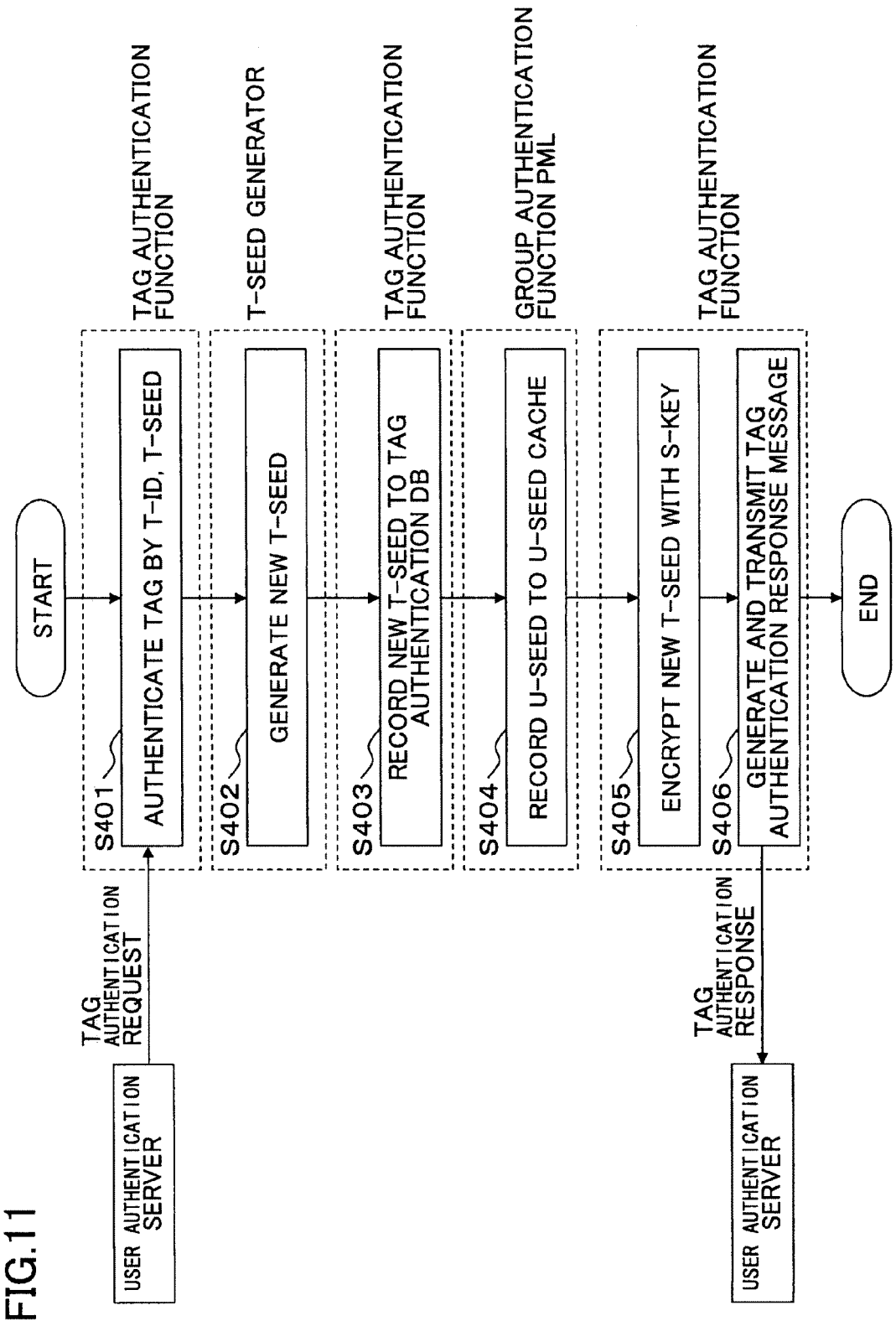
FIG. 11 is a flowchart of an operation during tag authentication by a PML server 4.
Figure 12:
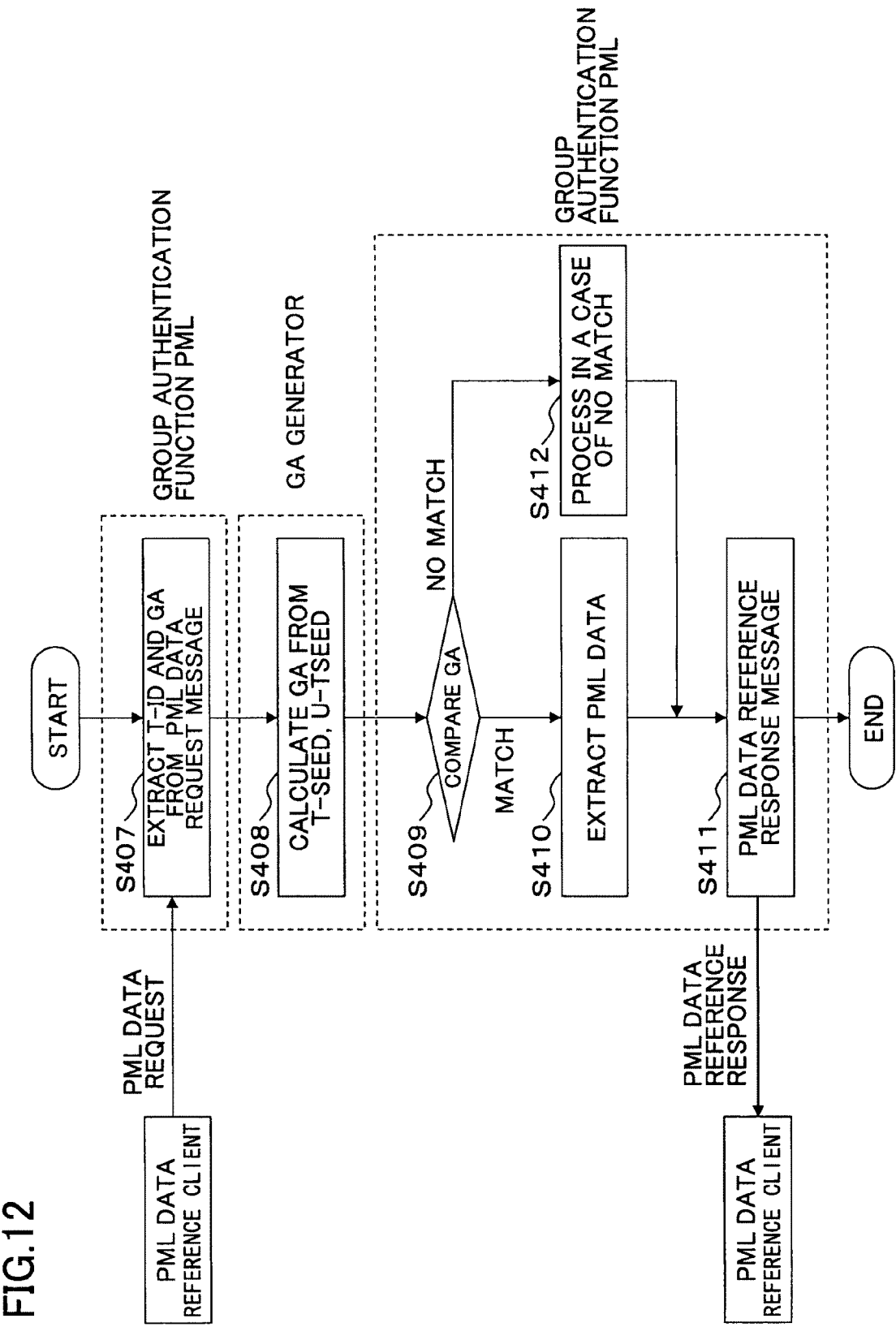
FIG. 12 is a flowchart of an operation during PML data request by a PML server 4.

FIG. 11 is a flowchart of an operation by the PML server 4 upon authentication of a tag, and FIG. 12 is a flowchart of an operation by the PML server 4 upon a request for PML data.

The operation of FIG. 11 is initiated upon receiving a tag authentication request message. In the drawing, in Step S401, a tag identification code T-ID and a one time password T-SEED are extracted from the tag authentication request message. A T-SEED is extracted from the tag authentication DB 4-5 by searching with the extracted T-ID and is compared with the T-SEED extracted from the tag authentication request message.

In a case where the T-SEEDs match, a new T-SEED is generated using the T-SEED generator 4-2 in Step S402. In Step S403, the new T-SEED is recorded in a corresponding area in the tag authentication DB 4-5.

Then, in Step S404, a one time password U-SEED is extracted from the tag authentication request message and is recorded in the U-SEED cache 4-6. Furthermore, in Step S405, the new T-SEED is encrypted with an S-key stored in the tag authentication DB. In Step S406, a tag authentication response message set with the encrypted new T-SEED is generated and transmitted to the user authentication server 3.

The operation of FIG. 12 is initiated upon receiving a PML data request message. In the drawing, in Step S407, a tag identification code T-ID and a group authentication code GA are extracted from the PML data request message. Then, in Step S408, a U-SEED is obtained from the U-SEED cache 4-6 by searching with the T-ID extracted from the PML data request message and a T-SEED is obtained from the tag authentication DB 4-5 by searching with the extracted T-ID. Then, the obtained U-SEED and T-SEED are input to the GA generator 4-4, to thereby calculate a group authentication code GA.

Then, in Step S409, a GA indicated in the PML data request message and the calculated GA are compared. In a case where there is a match according to the comparison results, the operation proceeds to Step S410. In a case where there is no match according to the comparison results, the operation proceeds to Step S412.

In Step S410, PML data are extracted from the PML-DB 4-7 by searching with the extracted T-ID. Then, in Step S411, a PML data reference response message set with the PML data is generated and transmitted to the PML data reference client 2.

Meanwhile, in a case where there is no match in Step S409, a process for no match is conducted. This process depends on the service and the data disclosure policy of the PML server. For example, the process may be to make the granularity of the disclosed data rougher or not to disclose the PML data at all.

Figure 13:
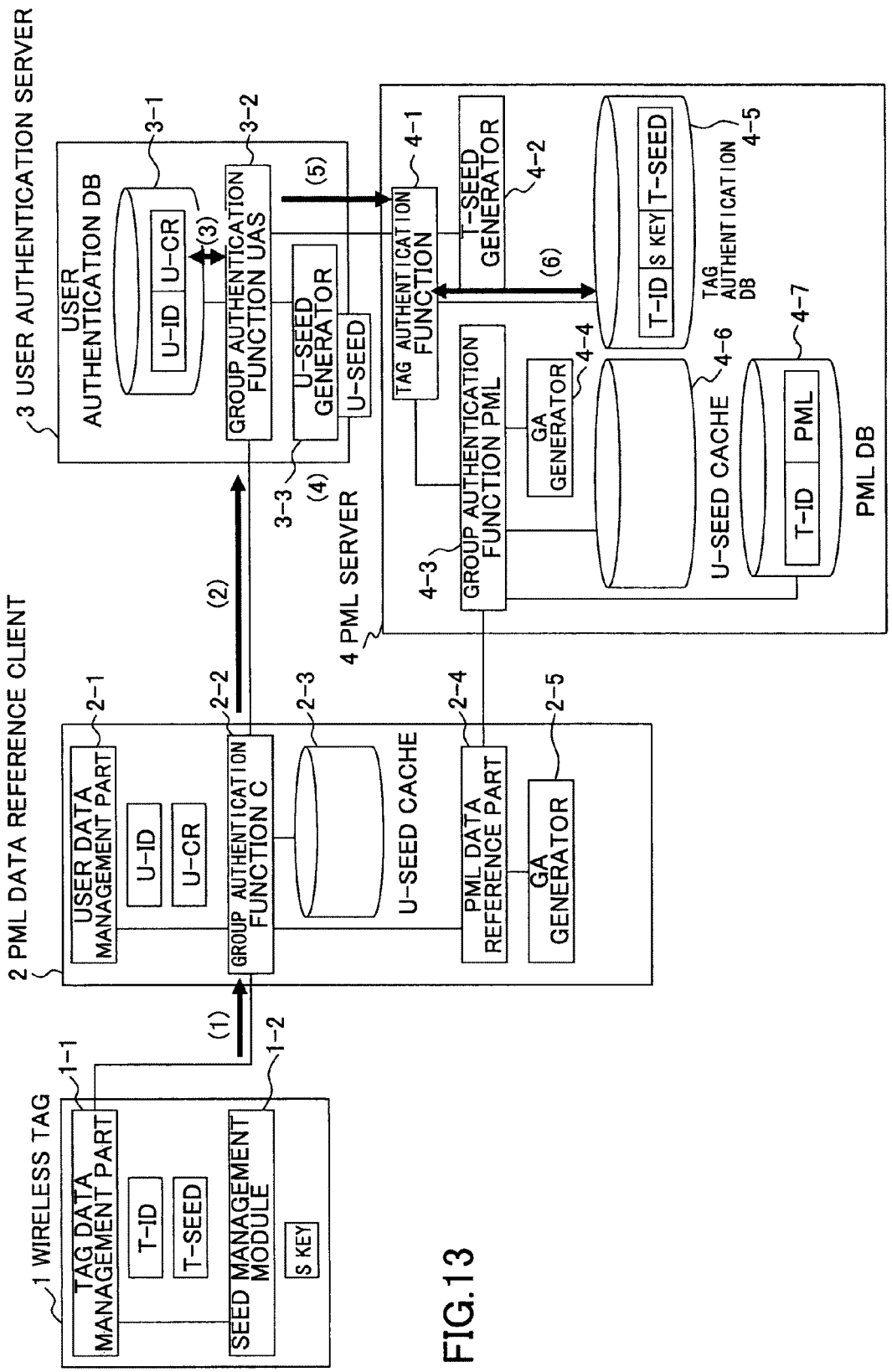
FIG. 13 is a diagram for describing sequences of a tag authentication operation.

FIG. 13 is a diagram for describing the sequences of a tag authentication operation. The below numbers enclosed with parenthesis correspond to the number enclosed with parenthesis in the diagram.

(1) The group authentication function client 2-2 of the PML data reference client 2 reads a wireless tag 1 and obtains a tag identification code T-ID and a one time password T-SEED from the tag data management part 1-1 of the wireless tag 1 (S201 of FIG. 8, S101-S103 of FIG. 7).

(2) The group authentication function client 2-2 of the PML data reference client 2 obtains a user identification code U-ID and a user certificate U-CR from the user data management part 2-1 and generates/transmits a wireless tag reference request message including a T-ID, a T-SEED, a U-ID, and a U-CR (S203-S204 of FIG. 8).

(3) The group authentication function server (UAS) 3-2 of the user authentication server 3 extracts a U-ID and a U-CR from the wireless tag reference request message and compares them with a U-ID and a U-CR stored in the user data DB 3-1 (S301 of FIG. 10).

(4) In a case where authentication succeeds (match according to comparison results), a U-SEED is generated (S302 of FIG. 10).

(5) A tag authentication request message is generated/transmitted to the PML server 4 (S303 of FIG. 10).

(6) The tag authentication function of the PML server 4 extracts a T-ID and a T-SEED from the tag authentication request message and compares them with a T-ID and T-SEED recorded in the tag authentication DB 4-5 (S401 of FIG. 11).

Figure 14:
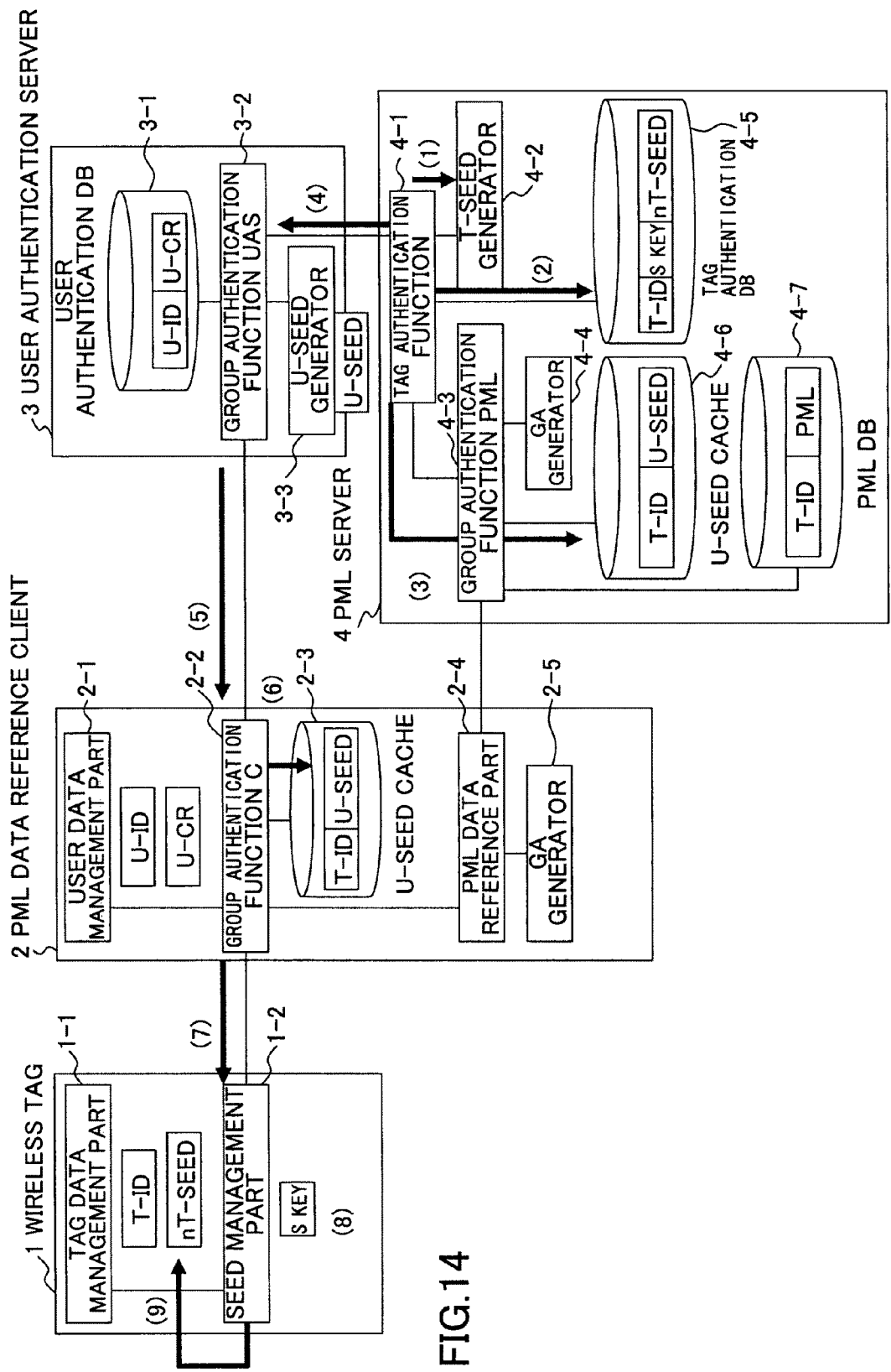
FIG. 14 is a diagram for describing sequences of a tag authentication verification operation.

FIG. 14 is a diagram for describing the sequences of a tag authentication confirming operation. The below numbers enclosed with parenthesis correspond to the number enclosed with parenthesis in the diagram.

(1) In a case where authentication succeeds (match according to comparison results), the tag authentication function 4-1 of the PML server 4 generates a new T-SEED (nT-SEED) with the T-SEED generator 4-2 (S402 of FIG. 11).

(2) The one time password T-SEED in the tag authentication DB 4-5 is replaced with the nT-SEED (S403 of FIG. 11).

(3) U-SEED data sent from the user authentication server 3 is reported to the group authentication function PML 4-3. The group authentication function PML 4-3 associates the U-SEED with a tag identification code T-ID and records them in the U-SEED cache 4-6 (S404 of FIG. 11).

(4) The tag authentication function 4-1 encrypts the nT-SEED with the S-key. The encryption method is, for example, the formula provided below.

$$P(nT\text{-SEED}) = G(T\text{-SEED}, S\text{-key}) \text{ XOR } nT\text{-SEED};$$

wherein P( ) is an encryption function, G( ) is a hash function, and XOR is an exclusive OR.

A tag authentication response message including a T-ID and a P(nT-SEED) is generated for the user authentication server 3 and transmitted to the user authentication server 3 (S404-S405 of FIG. 11).

(5) The group authentication function server (UAS) 3-2 of the user authentication server 3 generates/transmits a wireless tag reference response message including a T-ID, a P(nT-SEED), a U-ID, a U-SEED to the PML data reference client 2 (S304-S305 of FIG. 10).

(6) The group authentication function client 2-2 of the PML data reference client 2 extracts a T-ID and a U-SEED from the wireless tag reference response message and records them in the U-SEED cache 2-3 (S204-S205 of FIG. 8).

(7) The group authentication function client 2-2 of the PML data reference client 2 generates/transmits a SEED update request command including a P(nT-SEED) indicated in the wireless tag reference response message to the wireless tag 1 (S204-S206 of FIG. 8).

(8) The SEED management part 1-2 of the wireless tag extracts a P(nT-SEED) from the SEED update request command and decrypts the nT-SEED with the T-SEED and S-key. The decryption method is, for example, the formula provided below (S104 of FIG. 7).

$$nT\text{-SEED} = P(nT\text{-SEED}) \text{ XOR } G(T\text{-SEED}, S\text{-key})$$

(9) The SEED management part 1-2 of the wireless tag 1 overwrites the T-SEED recorded in the internal memory of the tag data management part 1-1 with the decrypted nT-SEED (S105 of FIG. 7).

Figure 15:
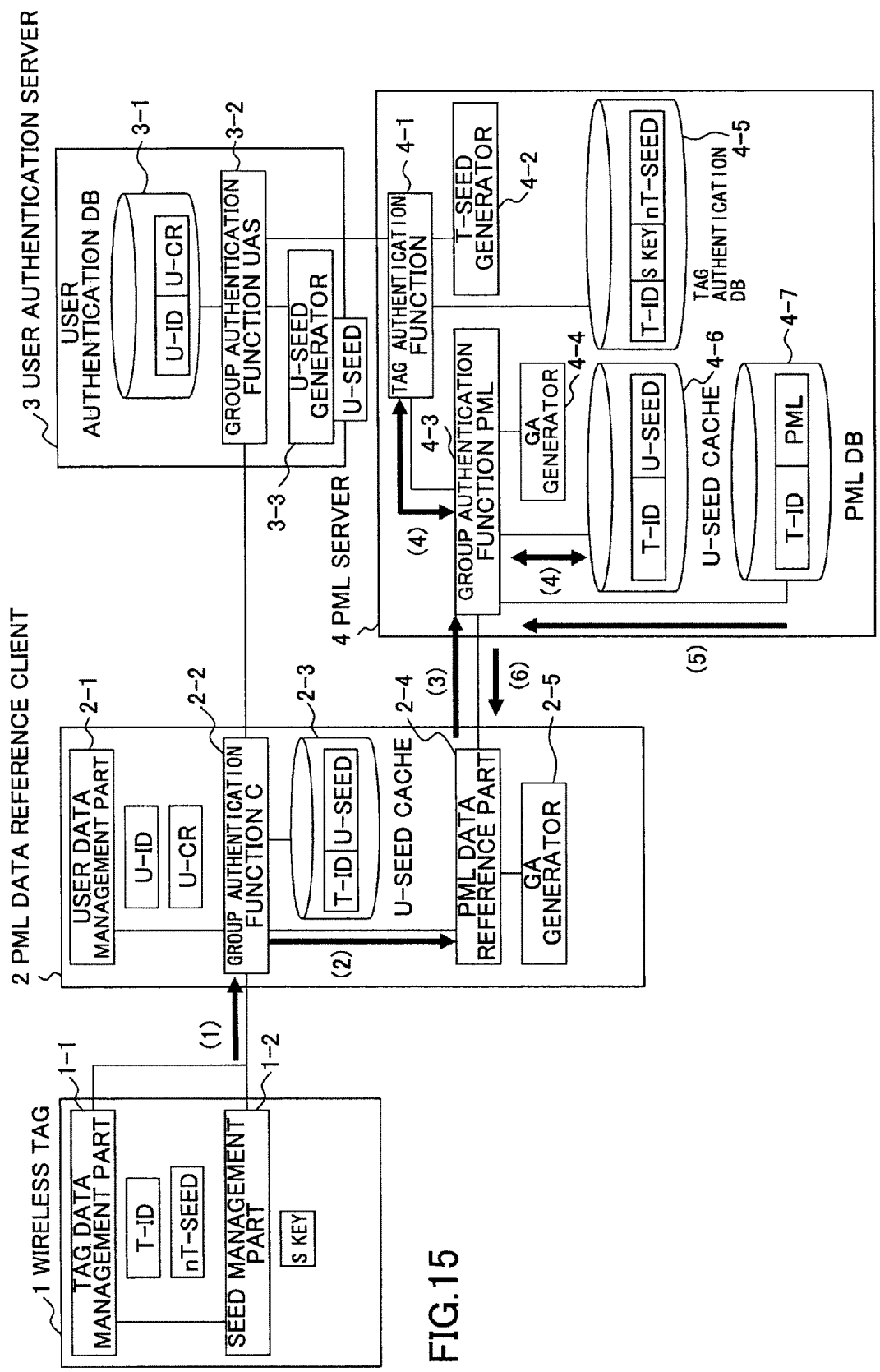
FIG. 15 is a diagram for describing a PML data reference operation.

FIG. 15 is a diagram for describing the sequences of a PML data referring operation. The below numbers enclosed with parenthesis correspond to the number enclosed with parenthesis in the diagram.

(1) The group authentication function client 2-2 of the PML data reference client 2 reads the wireless tag 1 and obtains a tag identification code T-ID and a one time password nT-SEED from the tag data management part 1-1 of the wireless tag 1 (S207 of FIG. 9, S101-103 of FIG. 7).

(2) The group authentication function client 2-2 extracts a U-SEED from the U-SEED cache 4-6 by searching with the T-ID. A group authentication code GA is generated with the extracted U-SEED and nT-SEED by using, for example, the formula provided below.

$$GA = G(U\text{-SEED}, nT\text{-SEED})$$

The group authentication function client 2-2 reports a T-ID and a GA to the PML data reference part (S208-S209 of FIG. 9).

(3) The PML data reference part 2-4 generates/transmits a PML data request message including a tag identification code T-ID and a group authentication code GA to the PML server 4 (S210 of FIG. 9).

(4) The group authentication function PML 4-3 of the PML server 4 extracts a tag identification code T-ID and a group authentication code GA from the PML data request message, extracts an nT-SEED corresponding to the T-ID from the tag authentication DB 4-5, and extracts a U-SEED corresponding to the T-ID from the U-SEED cache 4-6, to thereby calculate a group authentication code GA with the GA generator 4-4 by using, for example, the formula provided below.

$$GA = G(U\text{-SEED}, nT\text{-SEED})$$

The output result of the GA generator 4-4 is compared with the GA indicated in the PML data request message (S407-S408 of FIG. 12).

(5) In a case where authentication succeeds (match according to comparison results), PML data are read out from the PML=DB 4-7 (S409-S410 of FIG. 12).

(6) A PML data reference response message including a T-ID and PML data is generated/transmitted to the PML data reference client 2 (S411 of FIG. 12).

By using the present invention, a PML server, which manages wireless tag data, can authenticate the relationship between a wireless tag and the user referring to the wireless tag. Thereby, various data disclosure controls can be conducted with the PML server using group authentication.

Next, a more detail example of a service is described.

Embodiment 1

A service for providing data associated with a product(s) is described. One example of the service has a wireless reading device mounted on a mobile phone so that data of a product or a URL of a homepage providing new product information, product upgrades, and product recall announcements can be downloaded and data related to a purchased product can be automatically collected for notifying the user by reading various product management wireless tags of purchased products.

Figure 16:
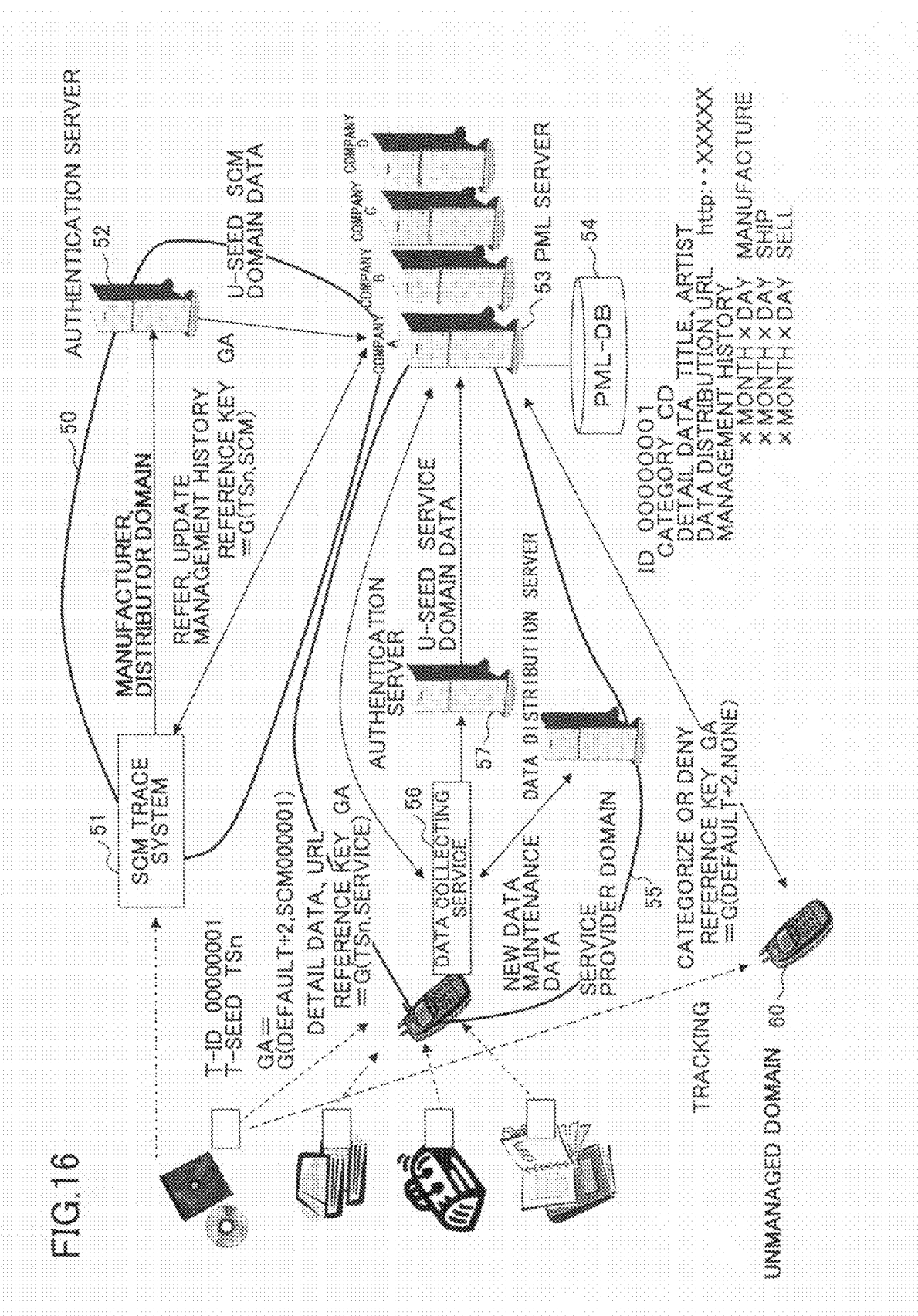
FIG. 16 is a diagram showing an image of providing by a data providing service.

FIG. 16 shows an image of a case where data are provided by a data providing service. A user purchases a CD, a book, a bag, and a memo pad and acquires related data by reading wireless tags attached to each of the products. In a case of a CD or a book, the acquired data may be, for example, new release data of the artist or the author. In a case of a bag, the acquired data may be, for example, product information of the same brand as the bag or data of accessories. In a case of a memo pad, the acquired data may be, for example, data of supplementary goods such as paper.

Although this service may be convenient for the user, there is a risk of the data being tracked by a third party as described above. Although data of the CD or the book itself may be harmless, the title or the author may be material for estimating preferences, and data related to the price may be material for estimating wealth. The wireless tags attached to products are usually attached for the purpose of SCM. It is anticipated that a product management history will be recorded in the PML server storing data of the ID of the products indicated by the wireless tags. There may be a case where such data are not desired to be disclosed to common consumers.

Furthermore, in a system that records history data, there is a need of a mechanism for verifying whether an object to be recorded is actually being handled. If there is no such mechanism, it becomes easy to falsify history data. Thus, the foundation of providing a safe product management system service may be shaken.

In the present invention, tag authentication can be realized by utilizing authentication of the user during referral to a wireless tag and a one time reference password (referred to as T-SEED) that changes whenever reference is made to it. Thereby, different purposes including a purpose of SCM, a purpose of providing service to common users, and a purpose of preventing third parties from tracking (unauthorized reading) can be served with the same system.

In an exemplary service shown in FIG. 16, domains are categorized into a domain of a manufacturer or a distributor conducting SCM of a product, a domain of a service provider for providing a service to a common user by using a wireless tag, and an unmanaged domain used only for the purpose of collecting data of wireless tags.

A manufacturer/distributor domain 50 includes an SCM trace system 51 for tracing a product and an authentication server 52 for authenticating distribution related entities. In the manufacturer/distributor domain 50, a U-SEED=SCM and domain data are transmitted to a PML server 53 for each referral to a wireless tag.

A service provider domain 55 includes a data collection service 56 for providing various data to the user, an authentication server 57 for authenticating a service using user, and a data distribution server 58 for distributing data of a product. In the service provider domain 55, a U-SEED=SERVICE and domain data are transmitted to the PML server 53 for each referral to a wireless tag.

In one exemplary service, domain data of an authentication server transmitting a U-SEED is added and managed in the above-described U-SEED cache 4-6 of the PML server 4 storing T-IDs and U-SEEDs, and data of a disclosure data policy established between the PML server 53 and the authentication servers 52, 57 are added upon contracting use of service.

The contract may be, for example, allowance of update or referral of management history in a case of the manufacturer/distributor domain 50. In a case of the service provider domain 55, the contract may be, for example, providing of detailed data and data reference URLs. In a case of the unmanaged domain 60, the contract may be, for example, providing of category data or denial of a request.

The PML server is normally managed in correspondence with each manufacturer of a product. In this example, a service with the PML server 53 of Company A is shown. The PML-DB 54 of the PML server 53 includes, for example, a category for indicating the type of object, detailed data regarding the object, data distribution URLs indicating special data for providing the service, and management history data of a product.

A PML data reference request from the manufacturer/distributor domain 50 is indicated with a group authentication code GA=G(TSn, SCM). "G( )" indicates a hash function, "TSn" indicates a T-SEED of the current wireless tag, and "SCM" indicates a U-SEED issued by an authentication server of a distributor domain.

The PML server 52 calculates a GA by using a U-SEED stored in the U-SEED cache 4-6 and a T-SEED stored in the tag authentication DB 4-5. When there is a match of the GA, domain data of the U-SEED stored in the U-SEED cache 4-6 and the disclosure policy allowing referral/update of management history where U-SEED=SCM from the disclosure policy established during contract are used, to thereby allow access to management history in response to an access request for PML data from the manufacturer/distributor domain.

Likewise, a PML reference request from the service provider domain 55 is indicated with a group authentication code GA=G(Tsn, SERVICE). U-SEED=SERVICE can be identified by the GA, and detailed data and URL are determined according to data disclosure policy.

A PML reference request from the unmanaged domain 60 is indicated with a group authentication code GA=G(TSn, not defined).

Access from the unmanaged domain 60 can be identified since the U-SEED resulting from the calculation with the group authentication code GA is not cached. Thereby, category data or denial can be determined according to data disclosure policy.

In a case of a manufacturer/distributor domain 50, it is important to check whether the corresponding object is actually referred to by using access of history data of the PML-DB 54. Thus, a tag authentication mechanism according to an embodiment of the present invention is described in detail with reference to FIG. 17.

Figure 17:
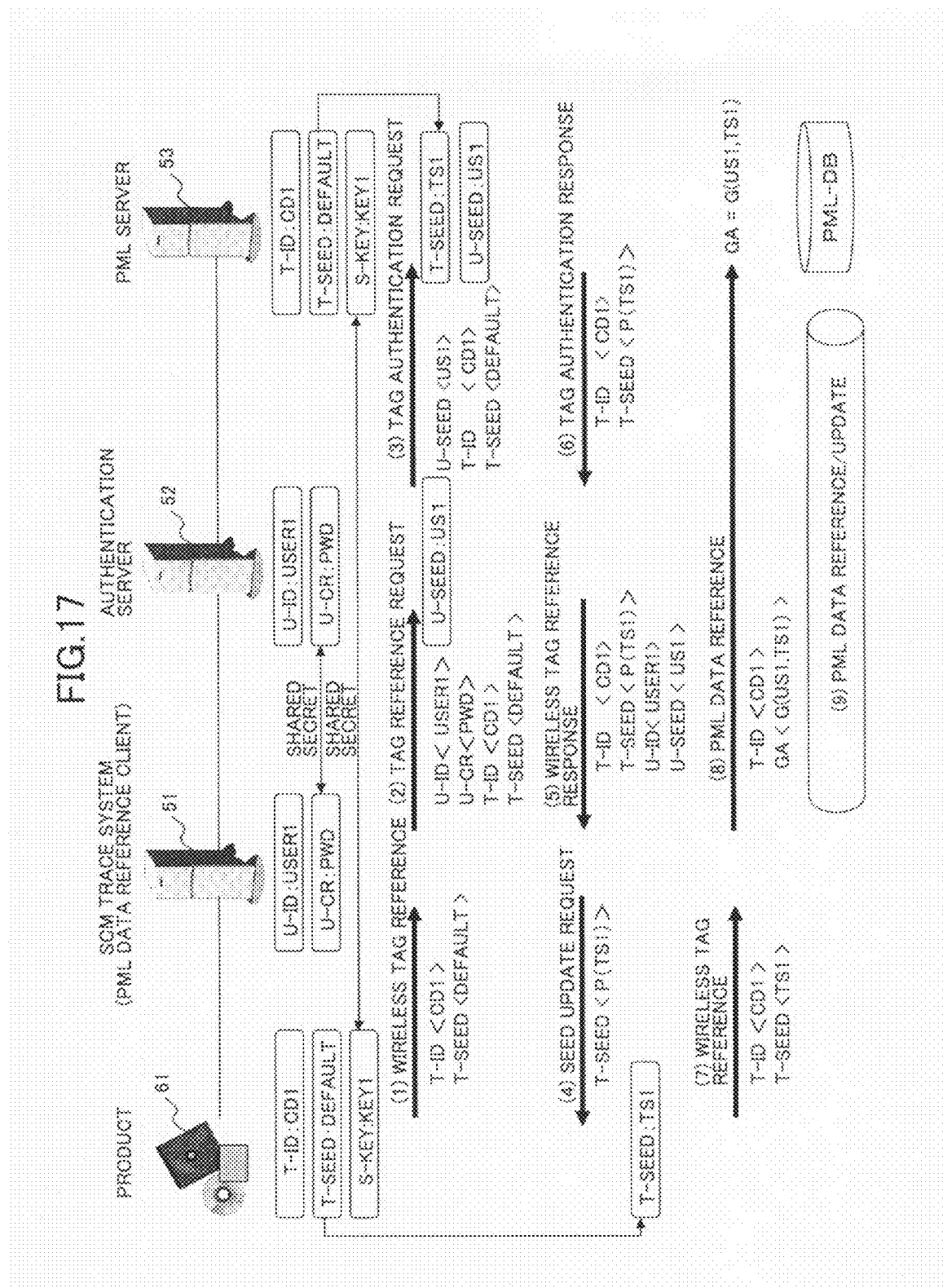
FIG. 17 is a diagram for describing in detail a mechanism of tag authentication with the present invention.

The configurations shown in FIG. 17 are the same as those of the manufacturer/distributor domain 50 shown in FIG. 16. A product 61 has a wireless tag 1 of the present invention attached thereto for SCM. A SCM trace system 51 corresponds to the above-described PML data reference client 2 according to an embodiment of the present invention. The authentication server 52 and the PML server 53 correspond to the above-described authentication server and the PML server according to an embodiment of the present invention.

A T-ID, a T-SEED, and a S-key are stored in the internal memory of the wireless tag 1 of the product and the tag authentication DB of the PML server 53. The S-key is a shared secret key between the wireless tag and the PML server. Although the T-ID, the T-SEED, and the S-key are actually streams of numerals or letters having a bit length determined according to the capacity of the system, the T-ID, the T-SEED, and the S-key are indicated with simplified codes for the sake of convenience.

The tag identification code T-ID is a unique ID for identifying a product (in this example, a CD) 61 and is indicated as "CD1". The one time password T-SEED is a dynamic one time password for accessing the CD1, and is indicated as "DEFAULT" assuming that no access has been made yet. The S-key is assumed to have a value "KEY1".

The SCM trace system 51 and the authentication server 523 have data for authenticating the user including a user identification code U-ID and a user certificate U-CR. The U-ID is data for uniquely identifying the user and is indicated as "USER1". The U-CR is data for indicating that the user is the user himself/herself (e.g., password) and is indicated as "PWD".

Next, sequences of tag authentication are described in detail with reference to FIG. 17.
(1) A wireless tag 1 returns T-ID="CD1" and T-SEED="DEFAULT" when the SCM trace system 51 refers to the wireless tag 1.
(2) The SCM trace system 51 transmits a tag reference request message including U-ID="USER1", U-CR="PWD" along with the T-ID and the T-SEED to the authentication server 52.
(3) The authentication server 52 extracts the U-ID and the U-CR in the tag reference request message and compares them with the U-ID and the U-CR set in the user authentication DB 3-1. Since the values in the user authentication DB 3-1 are U-ID="USER1" and U-CR="PWD", it is authenticated as the proper user. The authentication server 52 generates a one time reference password U-SEED of the wireless tag by using a U-SEED generator 3-3. Although the U-SEED is actually a stream of numerals or letters having a bit length determined according to encryption strength and capacity of the system, the U-SEED is indicated as "US1".

The authentication server 52 generates a tag authentication request message set with the generated U-SEED and the T-ID and T-SEED reported from the SCM trace system 51 and transmits it to the PML server 53.
(4) The PML server 53 compares the T-SEED indicated in the tag authentication request message with the T-SEED stored in the tag authentication DB. Since there is a match in the value of the current T-SEED "DEFAULT", it can be determined that the wireless tag 1 is being referred to. The PML server 53 records U-SEED="US1" and T-ID="CD1" in the U-SEED cache 4-6.

(5) The PML server 53 regenerates the T-SEED for confirming that the data of the most recent wireless tag 1 are not being tracked. Here, the value of the regenerated T-SEED is indicated as "TS1". The value of the T-SEED is encrypted with the S-key for preventing the SCM trace system 51 from knowing the value of the T-SEED. The encryption algorithm is, for example, P(TS1)=G(DEFAULT, KEY1) XOR TS1. Here, "G( )" is a hash function, and "XOR" is an exclusive OR. Although the present invention does not particularly limit the upgrading of encryption algorithms, the encryption process of T-SEED includes, for example, adding a SPI (Security Parameter Index) in communication data with respect to the wireless tag for enabling a given method to be selected from various encryption algorithms.

The PML server 53 transmits a tag authentication response message including a T-ID and the encrypted T-SEED P(TS1).

(5) The authentication server 52 generates a wireless tag reference response message including the T-ID, P(TS1) reported in the tag authentication response message along with U-SEED="US1" and U-ID="USER1" generated upon receiving the tag reference request message and transmits it to the SCM trace system 51.

(6) The SCM trace system 51 records U-SEED="US1" indicated in the wireless tag reference response message in the U-SEED cache 2-3 and uses a SEED update request message for reporting the P(TS1) to the wireless tag 1.

(7) The wireless tag 1 uses the P(TS1) and S-key for decrypting new T-SEED="TS1", for example, by reversely calculating an encryption algorithm defined as P(TS1) XOR G(DEFAULT, KEY1) and overwrites the value of T-SEED=DEFAULT with the value "TS1". The SCM trace system 51 conducts wireless tag referral again after the SEED update request is completed.

(8) In this example, the values read by the SCM trace system 51 by referring to the wireless tag are T-ID="CD1" and T-SEED="TS1". In order to access the PML-DB 54, the SCM trace system 51 calculates a group authentication code GA=G (US1, TS1) and transmits the GA and T-ID="CD1" as a PML data reference message to the PML server 53.

The PML server 53 searches the U-SEED cache and the tag authentication DB 4-5 with the T-ID="CD1" and extracts U-SEED="US1" and T-SEED="TS1" respectively. The group authentication code GA is calculated as GA=(US1, TS1). Since it matches with the GA transmitted from the SCM trace system 51, it can be confirmed that the SCM trace system 51 is properly referring to the wireless tag.

(9) The PML server 53 makes the access path to the PML-DB 54 accessible for the SCM trace system 51.

Hence, with the above-described system of the present invention, both a dynamically changing password (current T-SEED of a wireless tag) and a one time user password generated as a result of user authentication (U-SEED) are to be used for referring to a wireless tag. In addition, since the T-SEED changes when the U-SEED is issued, it can be authenticated whether a wireless tag is properly associated to the entity referring to the wireless tag.

Accordingly, since the relationship between the wireless tag and the user referring to the wireless tag can be authenticated according to an embodiment of the present invention, intentional manipulation of data by taking advantage of the fact that a wireless tag is properly referred or attacks with misleading data by distributing same IDs to plural servers can be prevented.

Furthermore, tracking of data can be prevented by controlling disclosure by using group authentication, for example, denying disclosure of data or increasing granularity of data to an observer not showing the relationship with the wireless tag.

It is to be noted that the tag identification code T-ID may correspond to identification data of the object described in the claims, PML data may correspond to identification data of the object, the one time password T-SEED may correspond to the first value, the one time value U-SEED may correspond to the second value, the group authentication code GA may correspond to the third value, the wireless tag 1 may correspond to the tag device, the PML data reference client 2 may correspond to the data reference client, the user authentication server 3 may correspond to the authentication server, the PML server 4 may correspond to the data server, the SEED management part 1-2 may correspond to the first value management part, the U-SEED cache 2-3 may correspond to the second value storing part, the PML data reference part 2-4 may correspond to the data reference part, the user certificate U-CR may correspond to the user data, the group authentication function C 2-2 may correspond to the authentication function part, the U-SEED generator 3-3 may correspond to the second value generation part, the user authentication DB 3-1 may correspond to the authentication database, the group authentication function UAS 3-2 may correspond to the authentication function part, the PML-DB 4-7 may correspond to the object data database, the U-SEED cache 4-6 may correspond to the second value storing part, the tag authentication DB 4-5 may correspond to the first value database, the GA generator 4-4 may correspond to the first value generation part, the tag authentication function 4-1 may correspond to the tag authentication function part, and the group authentication function PML 4-3 may correspond to the reference authentication function part.

Such wireless tag authentication method enables a tag apparatus to be associated with data of a referring entity and enables authentication of whether data of a tag apparatus is referred to by a proper referring entity.

Further, the present invention is not limited to these embodiments, but variations and modifications may be made without departing from the scope of the present invention.

What is claimed is:

1. An authentication method for disclosing identification data of an object and authenticating a referring entity in a case where the referring entity uses the identification data to refer to data of the object corresponding to the identification data comprising:

generating a third value by conducting a predetermined calculation with a temporary first value indicating a most recent referral to the identification data of the object and a temporary reference second value issued to the referring entity of the identification data for each referral; and authenticating a relationship between the object and the referring entity by verifying the third value;

wherein the temporary first value changes whenever the referring entity refers to the identification data;

wherein the temporary reference second value is issued to the referring entity whenever the referring entity refers to the identification data.

2. The authentication method as claimed in claim 1, wherein the second value is issued when authentication is acquired from authenticating the referring entity.

3. The authentication method as claimed in claim 1, wherein the first value is generated by an apparatus managing the data of the object corresponding to the identification data, wherein the apparatus managing the data of the object encrypts the first value by using a shared key with respect to the referring entity and sends the encrypted first value to a tag device attached to the object, wherein the tag device decrypts the encrypted first value by using the shared key, stores the decrypted first value with the identification data, and discloses the decrypted first value.

4. An authentication system comprising:
a tag device for disclosing identification data attached to an object;
a data reference client for referring to data of the object corresponding to the identification data of the object disclosed by the tag device;
an authentication server for authenticating a referring entity of the object and issuing a temporary second value to the referring entity of the identification data for each referral; and
a data server for storing data of the object corresponding to the identification data and storing the second value reported by the authentication server along with authenticating a temporary first value indicating the identification data disclosed by the tag device and the most recent referral of the identification data of the object, generating a new first value according to success of authentication, encrypting the generated first value with a shared key, and reporting the encrypted first value to the tag device;
wherein the tag device decrypts the encrypted first value by using the shared key, stores the decrypted first value, discloses the first value along with the identification data, and stores the second value in the data reference client;
wherein the data reference client generates a third value by conducting a predetermined calculation with the first value disclosed by the tag device and the stored second value and reports the generated third value along with the identification data disclosed by the tag device;
wherein the data of the object corresponding to the identification data is referred to by conducting authentication by comparing a third value obtained by conducting the predetermined calculation with the first and second values stored in the data server and the third value reported from the data reference client.

5. The authentication system as claimed in claim 4, wherein the data reference client and the authentication server are provided for each domain, wherein the data server stores domain data of the authentication server reporting the second value in correspondence with the second value for controlling disclosure of data of the object in accordance with a disclosure control policy corresponding to the domain data of the authentication server.

6. A tag device of an authentication system disclosing identification data of an object and authenticating when referring to data of the object corresponding to the identification data based on the identification data, the tag device comprising:
a tag data management part for returning a temporary first value indicating identification data of an object and a most recent identification data of the object in response to a request from a data reference client referring to data of the object;
wherein the temporary first value changes whenever the referring entity refers to the identification data.

7. The tag device as claimed in claim 6, further comprising:
a first value management part having a shared key between a data server storing data of the object corresponding to the identification data for decrypting a first value encrypted by the shared key from the data server, storing the first value, and disclosing the first value.

8. A data reference client of an authentication system disclosing identification data of an object and authenticating when referring to data of the object corresponding to the identification data based on the identification data, the data reference client comprising:
a second value storing part for storing a temporary reference second value issued to a referring entity of the identification data for each referral; and
a data reference part for generating a third value by conducting a predetermined calculation with a first value disclosed by a tag device and the second value stored in a cache, and conducting data referral with respect to a data server;
wherein the temporary reference second value is issued to the referring entity whenever the referring entity refers to the identification data.

9. The data reference client as claimed in claim 8, further comprising:
a user data management part for managing user data for associating with an authentication server authenticating a referring entity of the object; and
an authentication function part for requesting user authentication by using the user data when requesting issuance of the second value to the authentication server.

10. An authentication server of an authentication system disclosing identification data of an object and authenticating when referring to data of the object corresponding to the identification data based on the identification data, the authentication server comprising:
a second value generation part for generating a temporary reference second value issued to a referring entity of the identification data for each referral and reporting the second value to a data reference client and a data server;
wherein the authentication server reports a temporary first value indicating the most recent identification data of the object from the data server to the data reference client;
wherein the temporary first value changes whenever the referring entity refers to the identification data;
wherein the temporary reference second value is issued to the referring entity whenever the referring entity refers to the identification data.

11. The authentication server as claimed in claim 10, further comprising:
an authentication database for storing a plurality of user data; and
an authentication function part for conducting user authentication by searching for user data from the data reference client in the authentication database and operating the second value generation part according to success of authentication.

12. A data server of an authentication system disclosing identification data of an object and authenticating when referring to data of the object corresponding to the identification data based on the identification data, the data server comprising:
an object data database for storing data of the object corresponding to the identification data;
a second value storing part for storing a temporary reference second value issued to a referring entity of the identification data reported from an authentication server for each referral;
a first value database for storing a temporary first value indicating a most recent referral of the identification data of the object;

a first value generation part for generating the first value;

a tag authentication function part for authenticating the temporary first value indicating the identification data disclosed by a tag device and the most recent referral of the identification data of the object, generating a new first value with the first value generation part according to success of authentication, updating the first value database with the generated first value, encrypting the generated first value with a shared key, and reporting the encrypted first value to the tag device; and a reference authentication function part for receiving a third value from a data reference client, and authenticating referral to the object data database by comparing the received third value with a third value obtained by conducting a predetermined calculation with the first value of the first value database and the second value of the second value storing part.

13. The data server as claimed in claim 12, wherein the second value storing part stores domain data of the authentication server reporting the second value in correspondence with the second value for controlling disclosure of the object data database in accordance with a disclosure control policy corresponding to the domain data of the authentication server.

* * * * *